United States Patent [19] [11] 3,669,441
Minasian [45] June 13, 1972

[54] METHOD AND SYSTEM FOR AUTOMATICALLY ASSEMBLING LIMP WORKPIECES, SUCH AS GARMENT SECTIONS AND THE LIKE

[72] Inventor: Harry B. Minasian, Bronx, N.Y.
[73] Assignee: Ivanhoe Research Corporation, New York, N.Y.
[22] Filed: April 6, 1970
[21] Appl. No.: 25,838

[52] U.S. Cl. .................................................. 270/53, 270/57
[51] Int. Cl. ........................................ B42b 1/02, B65h 5/30
[58] Field of Search ....................... 270/52, 53, 37, 55, 57, 58

[56] References Cited

UNITED STATES PATENTS

| | | | |
|---|---|---|---|
| 3,271,023 | 9/1966 | Disbrow et al. | 270/58 |
| 3,162,434 | 12/1964 | Hepp | 270/57 |
| 2,736,999 | 3/1956 | Rouan et al. | 270/57 X |
| 3,511,494 | 12/1970 | Szentkuti | 270/52 |
| 3,216,719 | 11/1965 | Flora | 270/58 |

Primary Examiner—Robert W. Michell
Assistant Examiner—L. Oremland
Attorney—Robertson, Bryan, Parmelee & Johnson

[57] ABSTRACT

Method and system for automatically assembling limp workpieces, such as garment sections and the like in which a succession of first workpieces are transported by a compound conveyor system, and an overhead ramp displaces a portion of each of the first workpieces away from the conveyor to provide a clearance space for insertion of a succession of second workpieces. The conveyor system includes a pair of spaced parallel conveyor belts defining a gap between them, and the ramp has a leading end extending down into the gap to engage beneath the first workpieces with the ramp sloping upwardly and widening in the direction of advancement for elevating the displaced portions of the first workpieces. Transfer apparatus is arranged to reach into the clearance space beneath the ramp to deposit the second workpieces onto the conveyor belt beneath the ramp, and first clamping means holds another portion of the first workpiece on the other belt. The ramp descends to merge the first and second workpieces. The belt beneath the ramp terminates and is replaced by a pair of conveyor belts defining a gap corresponding with the desired line of attachment between the merged workpieces, this attachment being accomplished at a fastening station including additional clamping means, extending along on either side of the attachment line.

7 Claims, 2 Drawing Figures

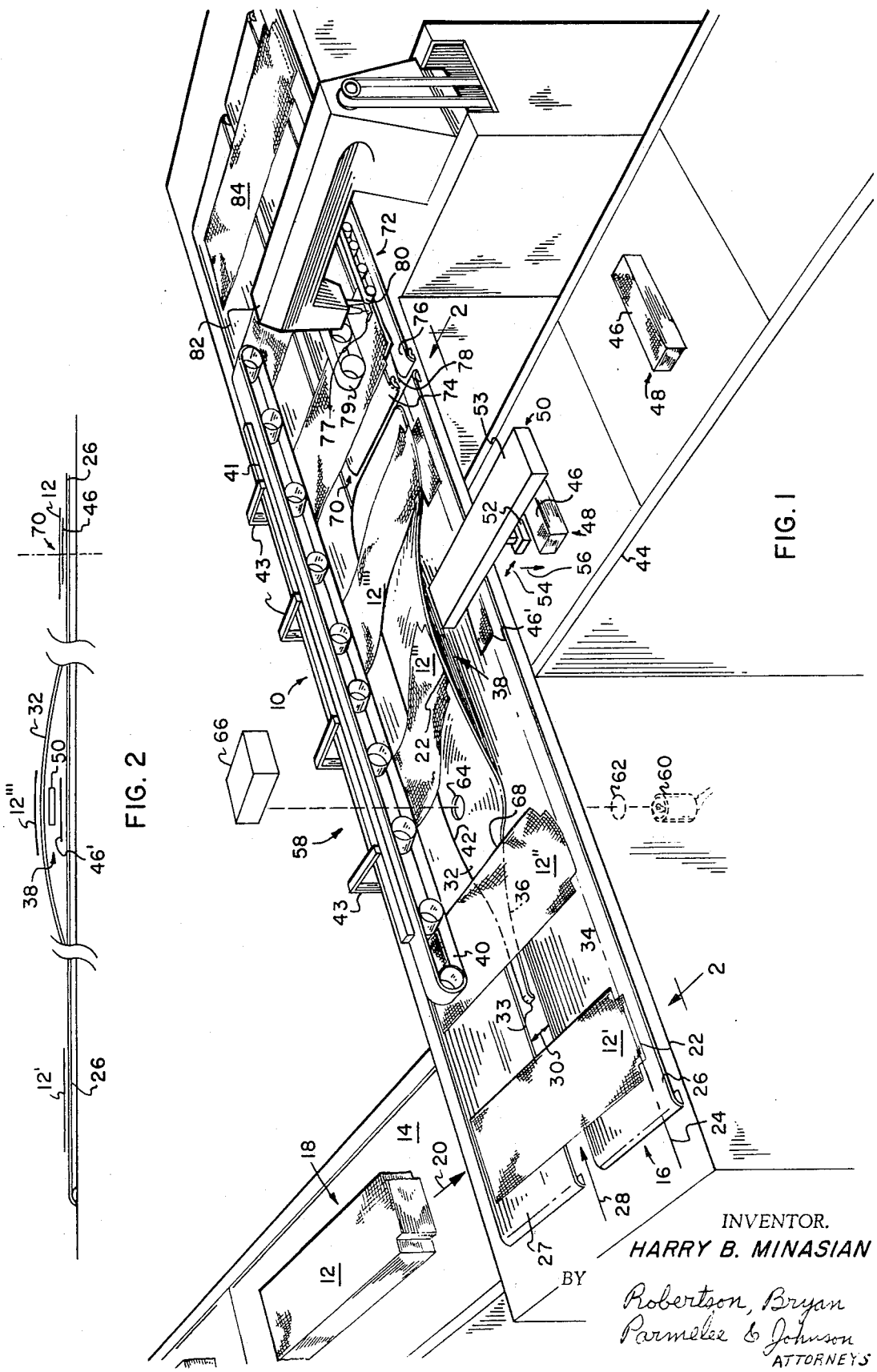

METHOD AND SYSTEM FOR AUTOMATICALLY ASSEMBLING LIMP WORKPIECES, SUCH AS GARMENT SECTIONS AND THE LIKE

This invention relates to a method and system for automatically assembling limp workpieces such as workpieces for use in making garments, apparel, headgear, footwear, home furnishings and the like from suitable fabric materials and the like. More specifically, this invention relates to a method and system for forming overlapping workpiece preassemblies by accurately locating a second workpiece, such as a precut garment section, underneath a larger workpiece in readiness for subsequent fastening together of the two workpieces.

In a method and system in accordance with the invention such workpieces, which, for example, may be in precut form, are supplied to a compound conveyor system. These first workpieces are deposited on the conveyor system which transports them while preserving their alignment as they are moved by the conveyor along a line of advancement. An overhead ramp is provided in operative relationship with the compound conveyor system to displace a predetermined portion of the deposited workpiece upwardly away from the conveyor system so as to form a workpiece receiving clearance space or recess beneath the displaced workpiece portions and above a local region of the compound conveyor system. The second workpieces are then deposited on this region of the conveyor in the recess below the displaced workpiece portions. The second workpieces are each deposited in accurate registration with respect to the displaced workpieces.

The intermittently moving conveyor system advances both workpieces, and the overhead ramp is arranged in cooperation with the conveyor system to bring the two workpieces together to preassemble them in accurately predetermined relationship as desired in readiness for fastening together.

In the illustrative embodiment the displaced workpiece is moved towards a downstream end of the ramp where it is moved directly on top of the lower workpiece with preselected relationship. An attaching station is provided in alignment with the conveyor system to receive the preassembled workpieces to fasten them together.

Among the advantages of the method and system of this invention for assembling limp workpieces are those resulting from the fact that an assembly of the workpieces is achieved with second workpieces being positioned beneath first workpieces in predetermined registered relationship in readiness for attachment one with the other.

Further advantages reside in the facility with which large limp workpieces may be manipulated to move them accurately over other limp workpieces for assembly therewith without loss of registration between them and maintaining the desired relationship relative to a workpiece attachment station.

The various aspects, objects and advantages of the present invention may be understood more fully from the following description of a preferred embodiment of the invention when considered in conjunction with the accompanying drawings, in which:

FIG. 1 is a perspective view of a compound conveyor system for assembling limp workpieces in predetermined overlapping relationship one with the other, several of the successive workpieces being shown in their respective positions during operation in accordance with the invention; and FIG. 2 is a partial side view in elevation taken along the line 2—2 of FIG. 1 of the system.

In the system 10 shown in the Figures, the limp workpieces 12, for example, such as precut garment workpieces, are deposited at 12' on a conveyor system 16 including a pair of intermittently moving endless belt conveyors 26 and 27, which are located in spaced parallel positions and are intermittently driven in the direction of the arrow 28 at the same speed. The workpieces 12 are supplied in stacks 18 by in-feeder conveyor means 14 positioned adjacent to the input end of the conveyor system 16. The in-feeder 14 provides the workpieces 12 in stacks, such as shown at 18, from which an individual workpiece differentiating and transfer apparatus indicated by the arrow 20 removes the workpieces one by one for transfer and deposit on the conveyor belts 26 and 27. A limp workpiece differentiating and transfer apparatus 20 suitable for this purpose is such as is described in detail and claimed in U.S. Pat. No. 3,442,505, issued May 6, 1969, to which reference may be made for further information.

The workpieces 12 which are illustratively shown are of a shape suitable for making back pockets for men's trousers. They are deposited at 12' with an edge, such as 22, accurately registered relative to an advancement line 24 extending parallel with the dual belts 26 and 27. The deposited workpiece 12' is sufficiently long relative to the size and spacing of the dual belts 26 and 27 that it extends across the space between them and engages a substantial area of the second belt 27.

The deposited workpiece 12' is advanced by the dual belts and is driven up an overhead ramp 32, as shown by the workpiece 12'' to expose a depositing clearance space or recess 38 below the moving workpiece 12'''. Second workpieces 46 are deposited at 46' in the recess 38 below the workpiece 12''' in alignment therewith as well as being in synchronized timing therewith so that the workpieces 12''' and 46' will accurately merge when they arrive at the downstream end of the ramp 32 in a region 70.

The merged workpieces are advanced past an attaching station 72 where they are fastened together and from which they emerge as a completed, accurately made, assembled portion of a garment, or the like.

As discussed above, the compound conveyor system 16 includes a pair of coplanar, laterally spaced, endless belts 26 and 27 which are intermittently moved at the same speed by a common motor drive means (not shown). Belts 26 and 27 are moved in the direction of the arrow 28 in a direction parallel with the advancement line 24.

The belts 26 and 27 are laterally spaced to define a longitudinal gap 30 generally beneath an intermediate portion of a deposited workpiece 12'. The ramp 32 is provided with a leading end portion 33 extending forward in an upstream direction and being sufficiently narrow to project down into the gap 30. Thus, in effect, the leading end portion 33, as it is encountered by the moving workpiece 12'', serves to arise gradually from the plane of the moving belts 26 and 27, and from the gap 30 in a gradually upwardly sloping direction to displace a garment workpiece, such as 12''', in an upwardly direction. The ramp 32 is shaped to gradually widen in the region 34 soon after the leading end 33 emerges above the conveyor plane. The width of the ramp 32 is increased with its edge 36 extending laterally towards the advancement line 24 and also the edge 36 is sloped upwardly until the ramp 32 extends laterally for a distance sufficient to elevate and vertically support the edge 22 of a displaced garment workpiece such as 12'''. The ramp edge 36 is curved upwardly as well as laterally so that ramp 32, in the vicinity of its maximum height and width defines a workpiece receiving recess or clearance space 38 between the under surface of ramp 32 and the belt 26.

The lifting action of the ramp 32 might disturb the registration of edges 22 of workpieces 12 relative to the advancement line 24. Hence, the portions of the moving workpieces 12'', 12''' and 12'''' overlying the other belt 27 are held in alignment with moving clamp means having the form of an endless hold-down clamping belt 40. This belt 40 extends parallel with the advancement line 24 and is moved at the same speed and direction as the belt 27. The hold-down belt 40 operatively engages workpieces 12'' at a location generally before the ramp 32 emerges significantly above the conveyor plane to assure firm clamping of the moving workpieces before they can be shifted by the emerging ramp. This moving belt clamping means 40 is mounted on a frame 41 held by brackets 43.

The other ramp edge 42, which lies near the conveyor belt 27, rises slightly above the conveyor plane and remains in that slightly elevated position for the length of the recess 28. As a result the portion of the ramp overlying recess 38 is laterally upwardly sloped, i.e. it is diagonally sloping, with the moving workpiece 12''' similarly supported with a laterally oriented upward inclination.

The recess 38 is operatively located opposite an in-feeder 44 of limp workpieces, such as precut garment sections 46. The in-feeder 44 supplies the workpiece 46 in stacks 48. An individual workpiece transfer apparatus 50 is disposed over a stack 48 and extends into the recess 38. A suction acting pick up and transfer head 52 is movably supported by a frame 53 for movement back and forth in the direction of the horizontal lateral arrow 54. Also, the suction head 52 is moved up and down as indicated by the vertical arrow 56. This suction acting pick-up and transfer head 52 may include one or more suction cups and drive mechanism such as disclosed and claimed in the above-mentioned U.S. Pat. No. 3,442,505, which issued May 6, 1969. The transfer head 52 deposits the workpieces one at a time, as shown at 46', in the clearance space 38 on the belt 26 with predetermined registration relative to the advancement line 24 and relative to the first garment workpiece 12'''.

The actuation of the workpiece transfer apparatus 50 is synchronized to the position of the workpiece 12'' by workpiece detector means 58. Detector means 58 are formed of a light source 60 whose light beam is focused by a lens 62 through an aperture 64 in the ramp 32 to be directed onto a photocell 66. Whenever the edge of a workpiece, such as the edge 68, moves over the ramp aperture 64, an electrical signal indicative thereof is obtained from the detector means 58. The dual conveyor 16 stops while each workpiece 46' is deposited.

This signal initiates the transfer apparatus 50, which deposits the workpiece 46' on the belt 26 in the recess 38 with a predetermined longitudinal position relative to the workpiece 12''' as shown in FIG. 2. The proper timing of the deposit of a workpiece 46' relative to the sensing of the edge 68 by the sensing means 58 to obtain accurate registration with a workpiece 12'' may be obtained by interposing an adjustable time delay between the occurrence of the signal from the photocell 66 and the actuation of the transfer apparatus 50.

After deposit of a garment section at 46', the belts 26 and 27 advance the two workpieces towards the merger region 70 where the lower workpiece and its associated upper registered workpiece are merged into the desired preassembled overlapping relationship. The ramp 32 is shaped to slant gradually downwardly toward the belts 26 and 27 to bring the upper workpiece down upon the lower one with selected overlap while the belts continue to advance the preassembled workpieces toward the attaching station 72.

After merger the workpieces are transferred from the belt 26 of the conveyor system 16 to a second portion of this conveyor system formed of the belt 27 together with a pair of spaced conveyor belts 74 and 76 separated by a gap 78 located directly below the area where the workpieces are to be fastened to each other along a desired attachment line, such as a stitching path, 77. A pair of clamping endless moving belts 79 and 80 are located on opposite sides of the gap 78 to firmly grip the preassembled workpieces while they are being attached to each other by fastening means, for example such as a sewing machine 82. Belts 79 and 80 are moved at the same speed as belts 26 and 27 and 40. It is noted that the clamping belt 40 maintains operative contact with the workpieces 12 until the attaching operation being performed at station 72 has been completed. In this manner the accurate alignment of the merged workpieces with respect to the line of advancement 24 is maintained. The completed workpiece assembly 84 is advanced to the end of belts 27, 74 and 76 where a transfer apparatus (not shown) removes and stacks them.

It is to be understood that the workpieces 12 or 46, or both, may themselves include one or more layers of limp material, for example such as layers of fabric attached together at an earlier stage in the manufacturing operation. Thus, the term "workpieces" as used herein is intended to include those which comprise a single layer and those which comprise more than one layer previously fastened together. The workpieces 46, which are illustratively shown, are of a shape suitable for forming the facing section of such a back pocket as mentioned above.

What is claimed is:

1. A method for automatically forming assemblies of limp workpieces, such as workpieces for use in making garments, apparel, headgear, footwear, home furnishings, and the like, to form assemblies of such workpieces comprising the steps of: transporting first limp workpieces on a conveyor surface along a line of advancement with said first workpieces being maintained in predetermined registration relative to said line of advancement, displacing a portion of said limp workpieces away from the conveyor surface while being transported along the line of advancement to provide a clearance space between the displaced workpiece and the conveyor surface, sensing the position of the moving displaced first workpieces, inserting second workpieces between the conveyor surface and the displaced first workpieces with each second workpiece being deposited on the conveyor surface in synchronous relationship with the sensed, moving, displaced first workpiece to obtain predetermined registration in time and place relative to a first workpiece, transporting said first and second workpieces and along the line of advancement to individually merge in registered relationship with one another, with each first workpiece overlying a second with said registered relationship, conveying said merged first and second workpieces to an attachment station, fastening said merged workpieces to one another to form an assembly thereof, and including the steps of continuously clamping said first limp workpieces while they are being transported and while they are being fastened to the second workpieces to maintain the first workpieces in accurate registration with respect to the line of advancement and with respect to the second workpieces.

2. A method for automatically assembling limp workpieces, such as for use in making garments, apparel, headgear, footwear, home furnishings, and the like, comprising the steps of: depositing first workpieces made of a limp garment material, and the like, on a conveyor with predetermined registration with respect to a workpiece advancement line extending in a direction parallel with the direction of travel of the conveyor, clamping an end of the workpieces to the conveyor to maintain the workpiece registration, elevating the other end of each successive first workpiece above the moving conveyor to provide clearance space beneath it to allow insertion of a second workpiece of limp garment material, and the like, below the elevated end of the first workpiece, depositing said second workpiece below the elevated end of the first workpiece in predetermined aligned relationship with the line of advancement and with the elevated workpiece, transporting the aligned workpieces towards a merger region and moving the first workpiece directly on top of the associated, aligned second workpiece, transporting the merged workpiece past an attachment station, clamping the merged garment workpieces to the conveyor adjacent the opposite sides of a predermined attachment line, and attaching the merged workpieces to one another along said predetermined attachment line to obtain accurate attachment of the workpieces.

3. A system for automatically assembling limp workpieces made of garment material and the like to form assemblies for garments and the like comprising means for transporting first limp workpieces along a line of advancement with said workpieces maintained with preselected registration with respect to said line of advancement; means for displacing a portion of each of said transported first workpieces in succession from the transporting means to form a workpiece receiving recess between the displaced portion of the first workpiece and the transporting means; said transporting means comprising a pair of endless laterally spaced conveyor belts operating in a common plane; said clamping means comprising an endless clamping belt operatively disposed in clamping relationship with one of said belts to grip transported workpieces therebetween, to maintain each of said first workpieces in said preselected registration throughout said displacement thereof; means for depositing limp second workpieces in said recess on said transporting means with each of said second workpieces in preselected alignment with a displaced portion of a corresponding first workpiece; said displacing means being shaped to return said displaced limp workpiece portion to the transporting means in overlying relationship with the corresponding second workpiece, means in alignment with the transporting means for attaching each of said first and second workpieces to one another along a desired attachment line to form said assemblies; and said transporting means further comprising a pair of spaced endless conveying belts operatively aligned with the other of said pair of conveyor belts to convey the merged workpieces past the attaching means, with the gap between the latter conveying belts being located in alignment with the desired attachment line of said merged garment workpieces.

4. A system for automatically forming assemblies of limp workpieces for use in manufacturing garments, and the like, from such workpieces comprising a conveyor system for transporting first limp workpieces along a line of advancement, with said workpieces being located on the conveyor system with predetermined registration with respect to the advancement line, said conveyor system including first and second endless parallel transporting belts spaced laterally from one another with a gap between them, said first workpieces resting on the belts and spanning across the gap between the belts; ramp elevating means inclined upwardly with respect to said conveyor belts for elevating above the first conveyor belt a portion of each successive first workpiece, said ramp elevating means including an upstream end emerging from said gap in an upwardly slanted direction, said ramp elevating means expanding laterally over said first conveyor belt to support the first workpiece portions in an elevated position above said first conveyor belt, inserting means for inserting second workpieces onto said first conveyor belt below said ramp elevating means; clamping holddown means extending along over the second of said conveyor belts adjacent to said ramp elevating means to grip the first workpieces against said second conveyor belt for preserving workpiece registration relative to said line of advancement; and said first and second workpieces being conveyed by the conveyor system toward a merger region where said ramp elevating means terminates to enable the elevated first workpiece portions to merge onto the respective second workpieces on said first conveyor belt with desired registration.

5. A system for automatically assembling limp workpieces made of garment material and the like to form assemblies for garments and the like comprising means for transporting first limp workpieces along a line of advancement with said workpieces maintained with preselected registration with respect to said line of advancement, said transporting means including first and second conveyor belts positioned in spaced parallel coplanar relationship defining a gap therebetween; means for displacing a portion of each of said transported first workpieces upwardly away from the first conveyor belt to form a workpiece receiving recess between the displaced portion of the first workpiece and the first conveyor belt, said means for displacing a portion of each of said transported first workpieces including a ramp having a leading end extending down into said gap, said ramp becoming wider and extending upwardly over said first conveyor belt in the direction of advancement for elevating the displaced portion of each of said workpieces to form said recess; means for depositing limp second workpieces in said recess on said first conveyor belt with each of said second workpieces in preselected alignment with the displaced portion of a corresponding first workpiece; said ramp being shaped to return said displaced limp first workpiece portion to said first conveyor belt in overlying relationship with the corresponding second workpiece; and means in alignment with the transporting means for attaching each of said first and second workpieces to one another along a desired attachment line to form said assemblies.

6. The system for automatically assembling limp workpieces made of garment material and the like as claimed in claim 5, in which said second workpiece depositing means extends into said recess above said first conveyor belt and beneath the wide elevated portion of said ramp for depositing the second workpieces on said first conveyor belt beneath said ramp.

7. The system for automatically assembling limp workpieces made of garment material and the like as claimed in claim 5, including clamp means positioned above said second conveyor belt adjacent to said ramp for holding said first workpieces firmly against said second conveyor belt while said displaced portions thereof are elevated by said ramp.

* * * * *